United States Patent
Liu

(10) Patent No.: US 9,545,938 B2
(45) Date of Patent: Jan. 17, 2017

(54) STROLLER WITH PIVOTABLE FRONT WHEEL ASSEMBLY

(71) Applicant: Unitron Enterprises Zhuhai Co., Ltd., Zhuhai (CN)

(72) Inventor: Xiuping Liu, Zhuhai (CN)

(73) Assignee: UNITRONTECH ZHUHAI CO., LTD., Zhuhai (CN)

(*) Notice: Subject to any disclaimer, the term of this patent is extended or adjusted under 35 U.S.C. 154(b) by 0 days.

(21) Appl. No.: 14/649,912

(22) PCT Filed: May 14, 2014

(86) PCT No.: PCT/CN2014/077477
§ 371 (c)(1),
(2) Date: Jun. 4, 2015

(87) PCT Pub. No.: WO2014/198174
PCT Pub. Date: Dec. 18, 2014

(65) Prior Publication Data
US 2015/0321689 A1     Nov. 12, 2015

(30) Foreign Application Priority Data
Jun. 9, 2013 (CN) .......................... 2013 1 0230941

(51) Int. Cl.
B62B 7/00 (2006.01)
B62B 7/06 (2006.01)
B62B 7/08 (2006.01)

(52) U.S. Cl.
CPC ................ *B62B 7/06* (2013.01); *B62B 7/064* (2013.01); *B62B 7/068* (2013.01); *B62B 7/08* (2013.01); *B62B 7/083* (2013.01); *B62B 2205/12* (2013.01); *B62B 2205/20* (2013.01)

(58) Field of Classification Search
CPC ................ B62B 7/00; B62B 7/06; B62B 7/08; B62B 7/064; B62B 7/068
See application file for complete search history.

(56) References Cited

U.S. PATENT DOCUMENTS

| 6,921,102 B2 | 7/2005 | Hsia |
| 2004/0207180 A1 | 10/2004 | Hsia |
| 2010/0044164 A1* | 2/2010 | Thorne .................. B62B 7/002 188/1.12 |

(Continued)

FOREIGN PATENT DOCUMENTS

| CN | 101306695 A | 11/2008 |
| CN | 202345737 U | 7/2012 |

(Continued)

OTHER PUBLICATIONS

Supplemental European Patent Office Search Report mailed Dec. 17, 2015 for European Patent Application No. 14801368.5.

*Primary Examiner* — Bryan Evans

(57) ABSTRACT

A stroller with a pivotable front wheel assembly. When folding the stroller, the front wheel assembly may pivot, exposing a flat surface which may be rested on the ground for easier storage of the stroller. A drive rod may drive the front wheel assembly to rotate during folding. A slider may move away from the front wheel assembly during folding, moving a rear tube into place and ultimately causing the drive rod to drive the front wheel assembly to rotate. A lock mechanism may be included to lock the frame into configuration.

18 Claims, 6 Drawing Sheets

(56) References Cited

U.S. PATENT DOCUMENTS

2011/0285111 A1* 11/2011 Liao .................. B62B 3/02
  280/651

FOREIGN PATENT DOCUMENTS

| CN | 202608846 U | 12/2012 |
| CN | 203332179 U | 12/2013 |
| EP | 0567422 A1 | 10/1993 |
| EP | 2495152 A1 | 9/2012 |
| GB | 549836 A | 12/1942 |

\* cited by examiner

STROLLER WITH PIVOTABLE FRONT WHEEL ASSEMBLY

CROSS-REFERENCE TO RELATED APPLICATION

This is a U.S. national application filed under 35 U.S.C. §371 of International Application No. PCT/CN2014/077477, filed May 5, 2014, which claims priority to Chinese National Application No. 201310230941, filed Jun. 9, 2013, the entire disclosures of which applications are expressly incorporated herein by reference.

FIELD OF THE DISCLOSURE

Embodiments of the present disclosure relate generally to strollers, and more specifically to a stroller with a pivotable front wheel assembly.

BACKGROUND OF THE DISCLOSURE

Strollers (e.g. baby strollers) are often ridden by infants and children, and have multiple deploying and folding configurations. These configurations may include a deployed configuration, wherein the stroller can be ridden, and a folded configuration. Ideally, the stroller should occupy less space, in the folded configuration thereby allowing easier storage.

One type of commercial available stroller available has a front wheel assembly and a front foot tube that are fixedly connected to each other with an included angle larger than 90 degrees between axes thereof. As a result of this arrangement, the frame cannot stand straight up once the stroller is folded, which means a person must stoop down to lay the stroller on the ground. Another kind of stroller in the market has a frame with a front foot tube and a handle tube displaceable relative to each other so that a standing point can be formed with respect to the front wheel assembly by projecting the handle tube beyond the front end of the front foot tube or by projecting the front end of the front foot tube beyond the front wheel assembly. However, with either of these two kinds of frames for making the stroller stand, the length of the frames cannot be reduced.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

A technical problem to be solved by the present disclosure is to provide a stroller with a pivotable front wheel assembly that can be turned when folding the stroller.

One embodiment of a stroller in accordance with the present disclosure may include a frame, a front wheel assembly and a rear wheel assembly, the frame comprising a front foot tube, a rear foot tube, a seat tube, a drive rod and a slider, the slider being slidably connected with the front foot tube, the lower end of the front foot tube being pivotably connected to the front wheel assembly, an upper end of the rear foot tube being pivotably connected to the slider, the lower end of the rear foot tube being fixedly connected with the rear wheel assembly, the two ends of the seat tube being pivotably connected to the front foot tube and the rear foot tube, respectively, the two ends of the drive rod being pivotably connected to the rear foot tube and the front wheel assembly, respectively, the frame having at least two configurations, a folded configuration and a deployed configuration, and the frame comprising a locking mechanism for keeping the frame in the deployed configuration, wherein in folding of the frame, the slider slides upwards relative to the front foot tube, and a lower end of the rear foot tube is driven by the seat tube and moves towards the front foot tube, and the drive rod drives the front wheel assembly to rotate around a pivot point of a lower end of the front foot tube.

Another embodiment of a stroller in accordance with the present disclosure may include a frame, the frame having at least a deployed configuration and a folded configuration, the frame including a front foot tube and a front wheel assembly pivotably connected to the front foot tube, wherein the front wheel assembly in the folded configuration comprises a substantially flat portion, the substantially flat portion being substantially perpendicular to the front foot tube.

A stroller with a pivotable front wheel assembly includes a frame, a front wheel assembly and a rear wheel assembly, the frame including a front foot tube, a rear foot tube, a seat tube, a drive rod and a slider, the slider being slidably connected with the front foot tube, the lower end of the front foot tube being pivotably connected to the front wheel assembly, the upper end of the rear foot tube being pivotably connected to the slider, the lower end of the rear foot tube being fixedly connected with the rear wheel assembly, the two ends of the seat tube being pivotably connected to the front foot tube and the rear foot tube, respectively, the two ends of the drive rod being pivotably connected to the rear foot tube and the front wheel assembly, respectively, the frame having two configurations, a folded configuration and a deployed configuration, and the frame comprising a locking mechanism for keeping the frame in the deployed configuration, wherein in folding of the frame, the slider slides upwards relative to the front foot tube, and the lower end of the rear foot tube is driven by the seat tube and moves towards the front foot tube, and the drive rod drives the front wheel assembly to rotate around the pivot point with the lower end of the front foot tube.

According to one embodiment of the present disclosure, further, during folding of the frame, the included angle between the front wheel assembly and the axis of the front foot tube becomes gradually smaller; and when the frame is in the folded configuration, the included angle between the front wheel assembly and the axis of the front foot tube is smaller than or equal to 90 degrees, and the front wheel assembly can form a frame standing surface.

According to one embodiment of the present disclosure, further, the stroller further comprises a handle tube telescopically inserted in the upper end of the front foot tube.

According to one embodiment of the present disclosure, further, the frame further comprises a transmission mechanism comprising an upper rack, a lower rack and a gear. The gear is pivoted in the front foot tube, the upper rack is fixedly connected with the lower end of the handle tube and inserted in the front toot tube and being engaged with the gear. The slider is sleeved on the front foot tube. The lower rack is engaged with the gear. A through slot is formed in the front foot tube at a position where the lower rack and the gear are engaged. The upper part of the lower rack passes through the through slot and being engaged with the gear, and being located outside the front foot tube and fixedly connected with the slider. During rotation of the gear, the upper rack and the lower rack move in opposite directions.

According to one embodiment of the present disclosure, further, the locking mechanism comprises a clamp, an elastic element, a pin and an unlocking pull rod. The clamp is an integrally formed piece with two ends and is arranged in a slotted hole formed in an inner cavity of the slider. A locking hole is formed in the front foot tube on a contact surface where the front foot tube and the slider slide relative to each other and engage with the first end of the clamp. The elastic element is arranged in the slotted hole. The unlocking pull rod is pivotably connected to the slider and provided with a spiral groove on the inner side. An elongated slotted hole is formed at the lower part of the slider. One end of the pin is pivotably connected to the second end of the clamp and the other end of the pin passes through the elongated slotted hole and is inserted into the spiral groove on the inner side of the unlocking pull rod. When the frame is deployed in a locked configuration, the first end of the clamp is pushed by the elastic element and engages with the locking hole to restrict the front foot tube and the slider from sliding relative to each other. When the frame is folded, the unlocking pull rod is rotated so that the radius of the curved surface of the spiral groove engage with the other end of the pin to cause the other end of the pin to move downwards, compressing the elastic element and causing the first end of the clamp to be separated from the locking hole, and the front foot tube and the slider are capable of sliding relative to each other.

According to one embodiment of the present disclosure, further, the frame further comprises a safety locking device, which comprises an unlocking cross bar, a hooked plastic piece and an elastic element. The two ends of the unlocking cross bar are pivotably connected to the unlocking pull rod, respectively. The elastic element is pivotably connected to the seat tube by a pivot shaft. The hooked plastic piece is fixedly connected with the elastic element. When the frame is in a fully deployed configuration, under a force of the elastic element, the hooked plastic piece approaches the unlocking cross bar and hooks the unlocking cross bar. In order for the unlocking cross bar to be lifted, the hooked plastic piece must be released from the unlocking cross bar.

According to one embodiment of the present disclosure, further, both the clamp and the slider are made of plastic material, steel or aluminum alloy.

According to one embodiment of the present disclosure, further, the handle tube, the front foot tube, the rear foot tube, the seat tube and the drive rod are made of steel or aluminum alloy.

In one embodiment, during folding of the frame, the front wheel assembly rotates around a movable pivot point on the front foot tube. This movement can be continuous while the frame is folding. After folding, the included angle between the front wheel assembly and the front foot tube is shorter than it was prior to folding. The front wheel assembly forms a stroller frame standing surface to achieve the functions of enabling the stroller frame to stand and reducing the length of the folded frame. As a result, a user does not has to stoop down to place the stroller. Also, because the total length of the folded frame is shorter due to the rotation, the stroller is more convenient and easier to store.

BRIEF DESCRIPTION OF THE DRAWINGS

By way of example, various embodiments of the disclosed device will now be described, with reference to the accompanying drawings, in which.

DETAILED DESCRIPTION

Figure 1:
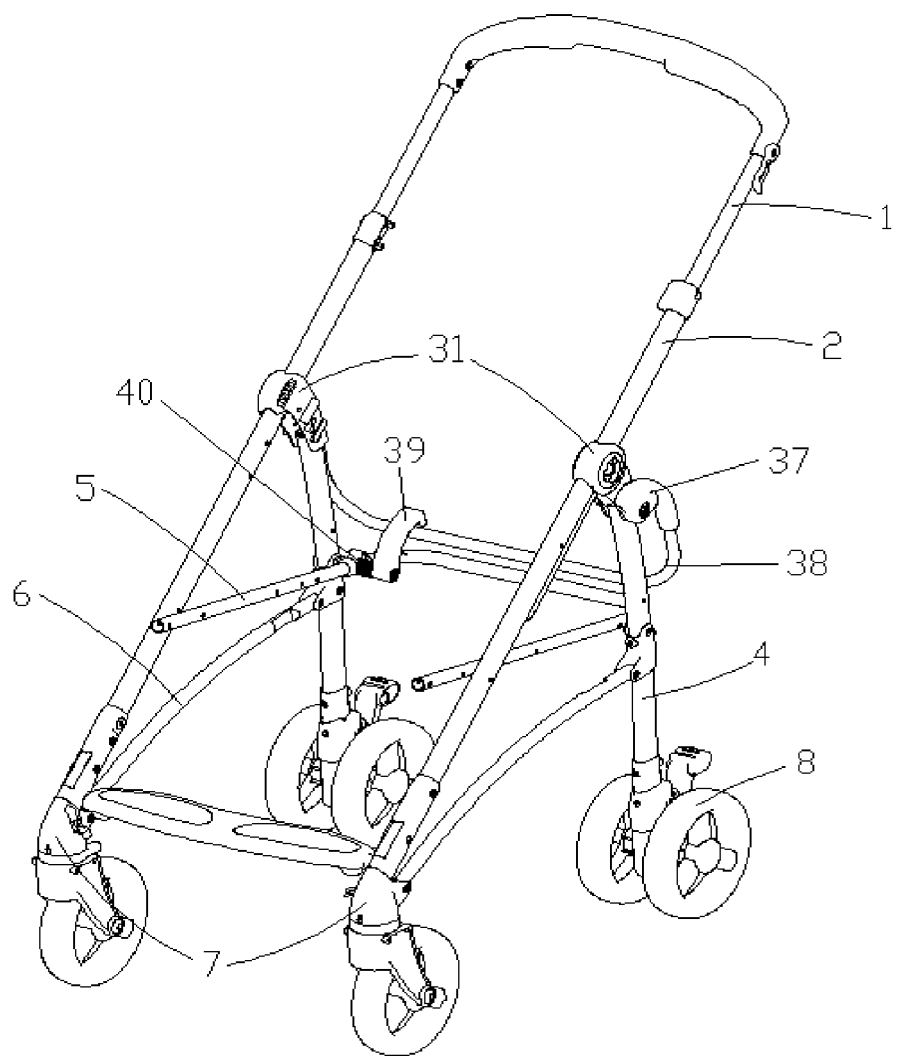
FIG. 1 is a perspective view of a stroller according to an embodiment of the present disclosure in a deployed configuration.
Figure 2:
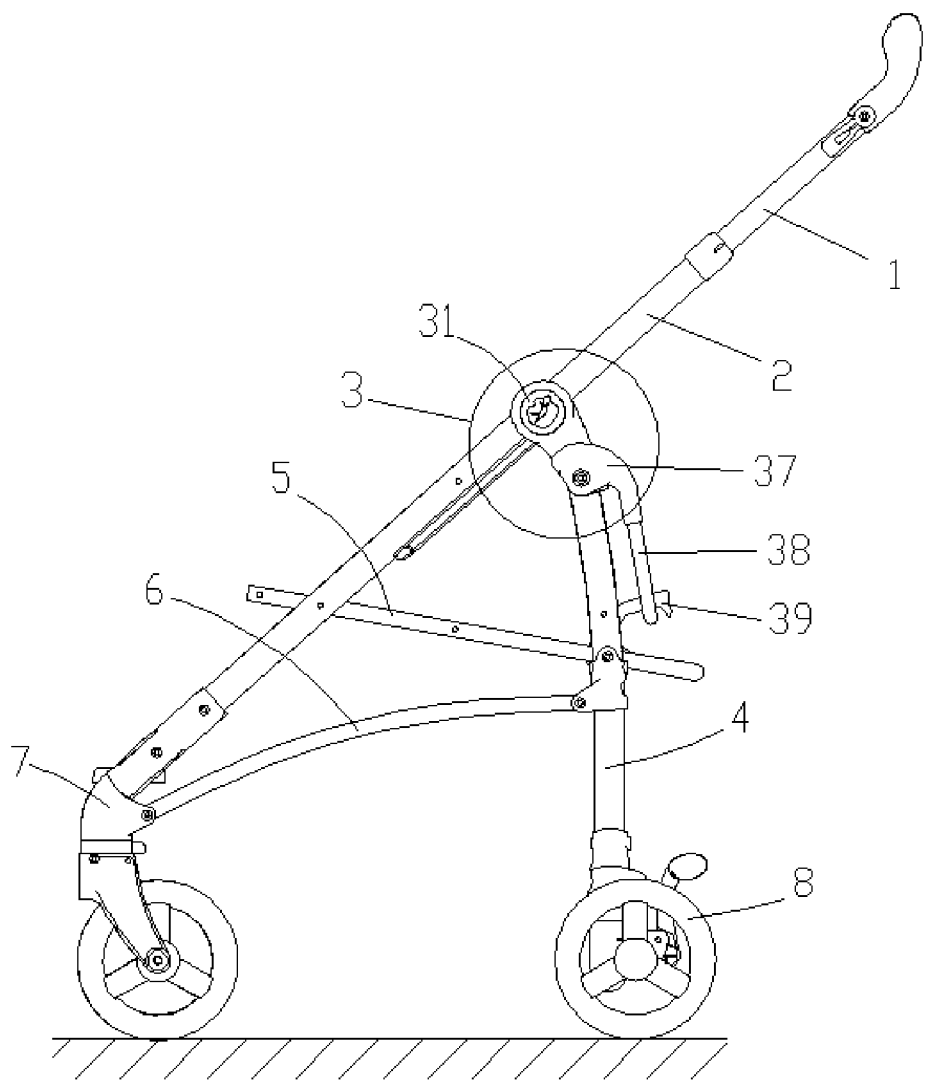
FIG. 2 is a side view of the stroller shown in FIG. 1 in the deployed configuration.
Figure 3:
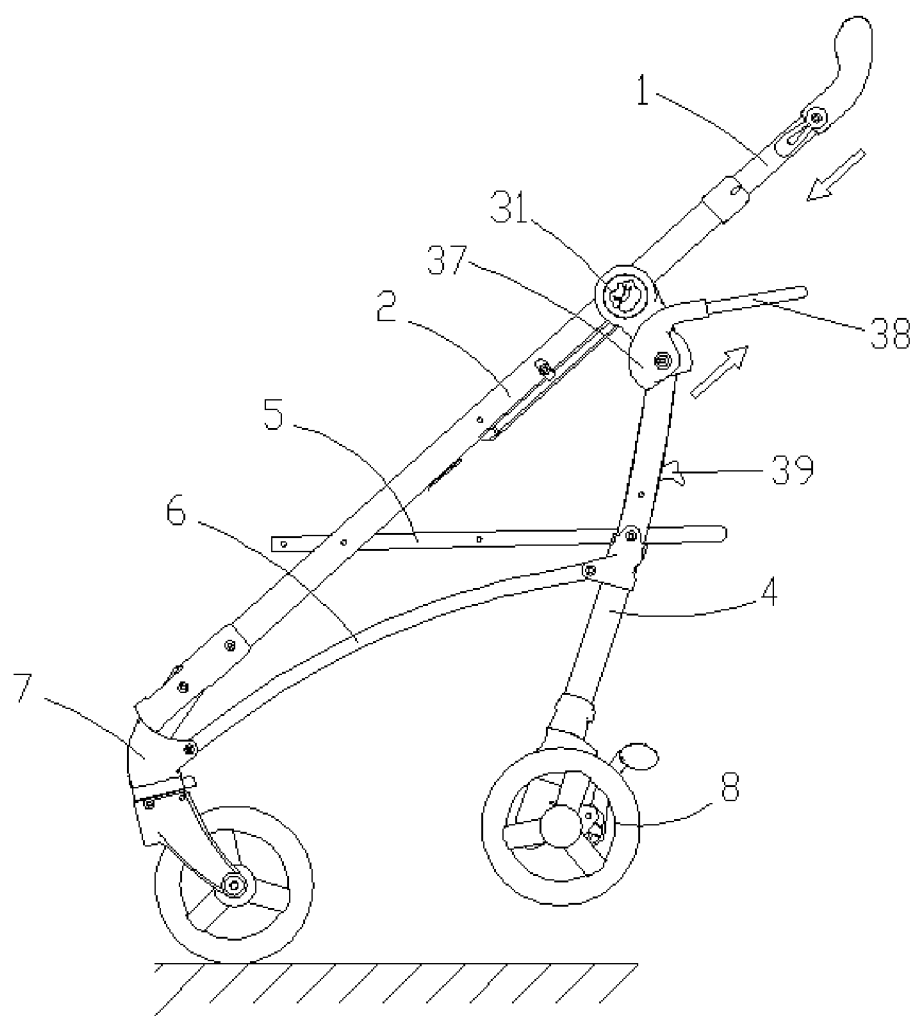
FIG. 3 is a side view of the stroller shown in FIG. 1 in the process of transitioning from the deployed configuration to a folded configuration.
Figure 4:
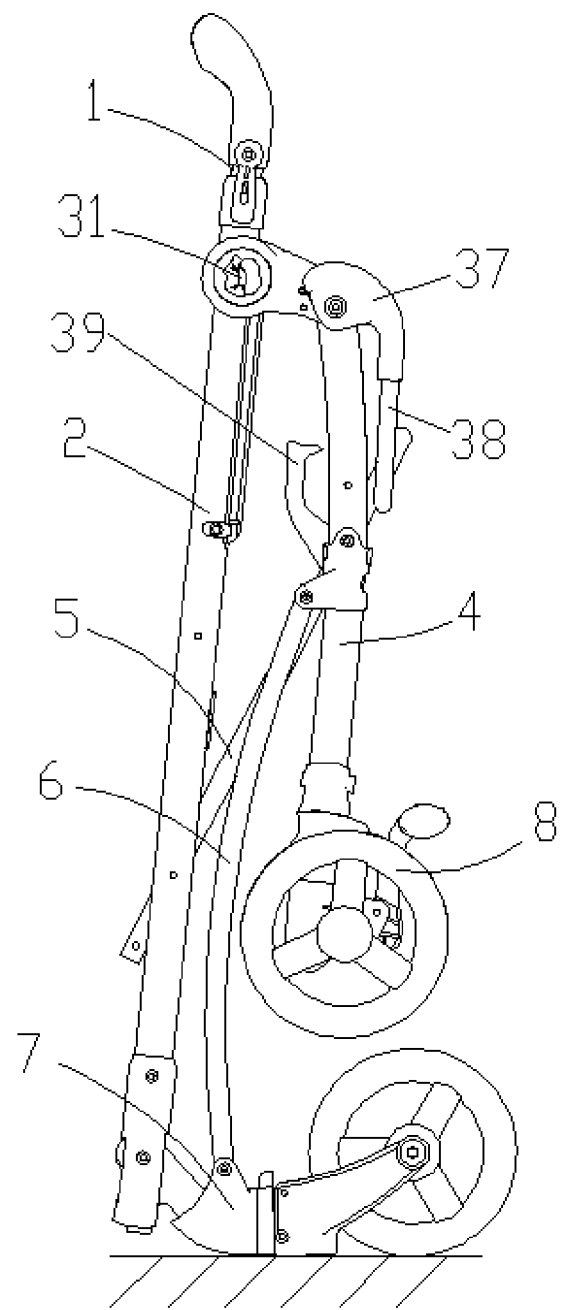
FIG. 4 is a side view of the stroller shown in FIG. 1 in the folded configuration.
Figure 5:
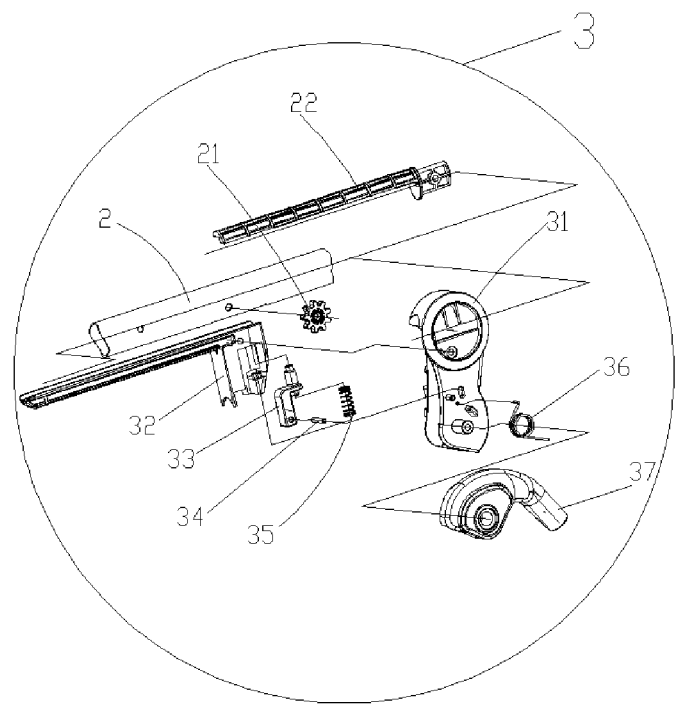
FIG. 5 is an exploded view of a slider and a built-in locking mechanism of the stroller shown in FIG. 1.
Figure 6:
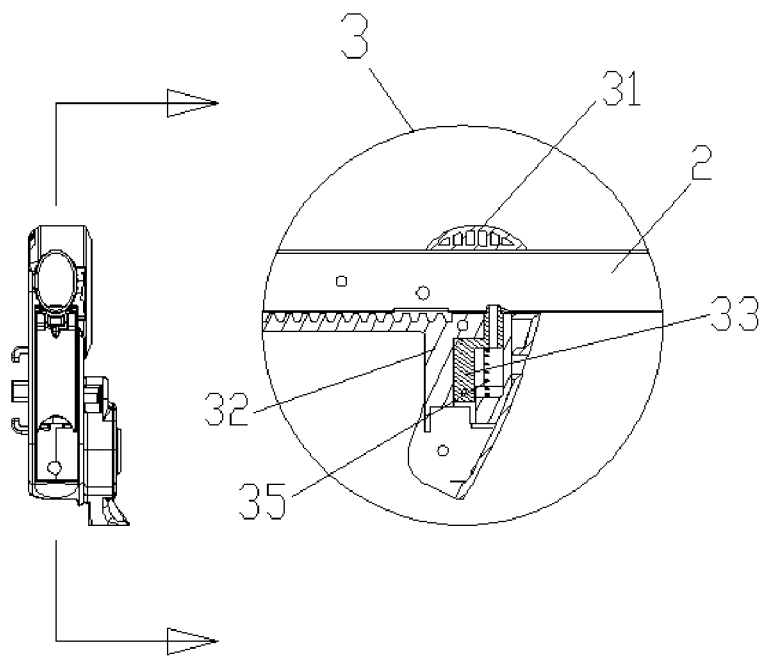
FIG. 6 is a sectional view of a slider with a clamp inserted into a front foot tube of the stroller shown in FIG. 1.
Figure 7:
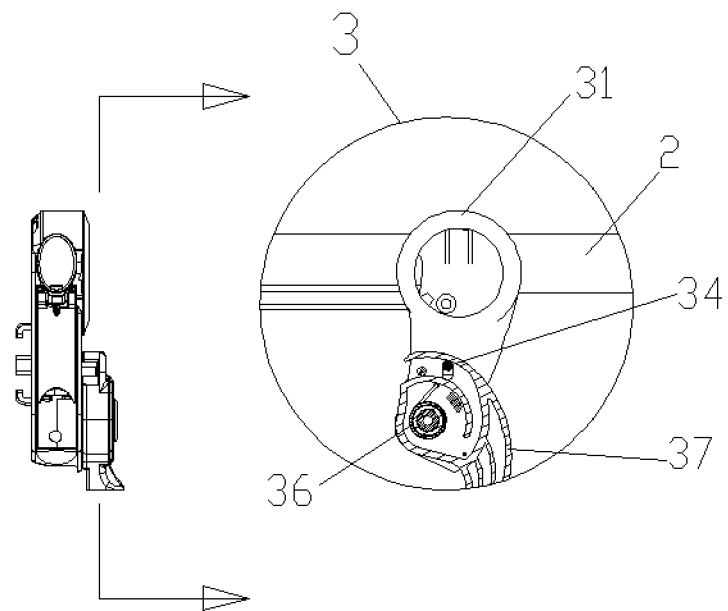
FIG. 7 is a sectional view of an unlocking pull rod for use with a slider of the stroller shown in FIG. 1.

Technical schemes of the present disclosure will be further described in more detail with reference to the specific embodiments and the drawings.

FIGS. 1-8 are schematic diagrams of an embodiment of a stroller with a pivotable front wheel assembly of the present disclosure. As shown in the figures, the stroller comprises a frame, a front wheel assembly 7 and a rear wheel assembly 8.

The frame comprises a front foot tube 2, a rear foot tube 4, a seat tube 5, a drive rod 6 and a slider 31. The front wheel assembly 7, the rear wheel assembly 8, the front foot tube 2, the rear foot tube 4, the seat tube 5, the drive rod 6 and the slider 31 are all provided in pairs and arranged symmetrically.

As shown especially in FIGS. 1-4, the slider 31 is slidably connected with the front foot tube 2. The lower end of the front foot tube 2 is pivotably connected to the front wheel assembly 7. That is, pivot holes are formed at the lower end of the front foot tube 2 and the upper end of the front wheel assembly 7, respectively, and the lower end of the front foot tube 2 is pivotally connected with the front wheel assembly 7 by a pivot shaft. The upper end of the rear foot tube 4 is pivotably connected to the slider 31, and the lower end of the rear foot tube 4 is fixedly connected with the rear wheel assembly 8. This can be done by way of threaded connection, buckled connection, or other methods used in the art.

The two ends of the seat tube 5 are pivotably connected to the front foot tube 2 and the rear foot tube 4, respectively. The two ends of the drive rod 6 are pivotably connected to the rear foot tube 4 and the front wheel assembly 7, respectively.

The frame has two configurations, a folded configuration and a deployed configuration. When transitioning from the deployed configuration to the folded configuration, the slider 31 slides upwards relative to the front foot tube 2. Since the upper end of the rear foot tube 4 is pivotably connected to the slider 31, the rear foot tube 4 moves upwards. Also, the lower end of the rear foot tube 4 is driven by the seat tube 5 and moves towards the front foot tube 2.

Since the two ends of the drive rod 6 are pivotably connected to the rear foot tube 4 and the front wheel assembly 7, respectively, the drive rod 6 causes the front wheel assembly 7 to rotate around the pivot point at the lower end of the front foot tube 2. The rotation direction of the front wheel assembly 7 can be set depending the particular application of the stroller. For example, the direction can be towards or away from rear wheel assembly 8.

According to one embodiment of the present disclosure, the included angle between the front wheel assembly 7 and the axis of the front foot tube 2 is reduced through folding. The angle may be larger than 90 degrees in the deployed configuration, but less than 90 degrees in the folded configuration. As a result, when the frame is in its folded configuration, the front wheel assembly 7 forms a surface on which the frame can stand vertically.

According to one embodiment of the present disclosure, a handle tube 1 is telescopically inserted in the upper end of the front foot tube 2.

As shown in FIGS. 5-8, according to one embodiment of the present disclosure, sliding of the slider 31 can slide manually relative to the front foot tube 2. In one embodiment there may be a transmission mechanism, comprising an upper rack 22, a lower rack 32 and a gear 21.

The gear 21 is pivoted in the front foot tube 2, and an opening is formed on the wall of the front foot tube 2 below the position where the gear 21 is pivoted, according to the needs of the particular application. The upper rack 22 is fixedly connected with the lower end of the handle tube 1 by way of threaded connection, buckled connection, or other methods known in the art. The upper rack 22 is inserted in the front toot tube 2 and engaged with the gear 21. The front foot tube 2 is sleeved with the slider 31. The lower rack 32 is arranged in an inner cavity of the slider 31 and fixedly connected therewith by way of threaded connection, buckled connection, or other methods known in the art. The lower rack 32 is engaged with the gear 21 at the opening below the position where the front foot tube 2 is pivotably connected to the gear 21. During rotation of the gear 21, the upper rack 22 and the lower rack 32 move in opposite directions.

When the handle tube 1 moves downwards, the slider 31 is pushed by the gear 21 and slides upwards relative to the front foot tube 2 to fold the frame. When the handle tube 1 moves upwards, the slider 31 is pushed by the gear 21 and slides downwards relative to the front foot tube 2 to deploy the frame.

When the slider 31 moves upwards relative to the front foot tube 2, the handle tube 1 is pushed by the gear 21, moves downwards, and retracts into the front foot tube 2 to fold the frame. When the slider 31 moves downwards relative to the front foot tube 2, the handle tube 1 is pushed by the gear 21, moves upwards, and projects out of the front foot tube 2 to deploy the frame.

According to one embodiment of the present disclosure, the locking mechanism 3 comprises a clamp 33, a spring 35, a torsional spring 36 and an unlocking pull rod 37. The locking mechanism 3 may also be provided in pairs and arranged symmetrically.

Figure 8:
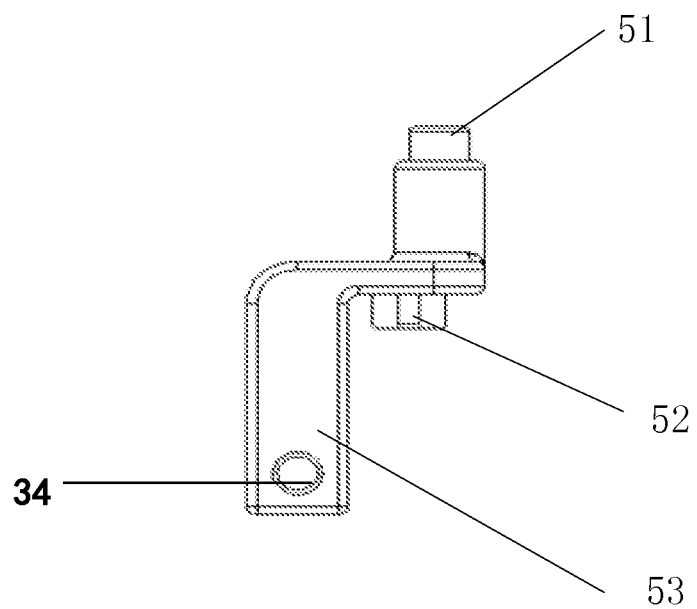
FIG. 8 is a profile view of a clamp for use with a slider of the stroller shown in FIG. 1.

As shown in FIG. 8, the clamp 33 is an integrally formed piece, having a first end 51 opposite to the contact surface of the front foot tube 2, and a second end 53 passing through a slotted hole on the slider 31 and being movably connected with a spiral groove on the inner side of the unlocking pull rod 37. The clamp 33 is provided with a spring support portion 52 in a middle position.

According to one embodiment of the present disclosure, the clamp 33 may also be in other shapes so as to combine with an elastic piece to form a locking structure. For example, a structure with a protrusion is formed, the protrusion serves as a supporting part of an elastic piece, and the elastic piece is arranged in the slotted hole and abuts against the protrusion and forces one end of the clamp 33 into a positioning hole. Other mechanisms known in the art may also be used.

The first end 51 of the clamp 33 may also be additionally provided with a steel mount to reinforce locking strength. The second end 53 may also be provided with a radial steel mount 34 passing through an elongated slotted hole on the slider 31. Because the second end 53 is movably connected with the spiral groove on the inner side of the unlocking pull rod 37, this arrangement may reinforce the pulling effect with respect to rotation of the spiral groove (after insertion into the spiral groove).

According to one embodiment of the present disclosure, the lower rack 32 and the slider 31 may be formed integrally or connected in a buckled manner. Mechanisms known in the art may be used for this connection.

The clamp 33 is arranged in an inner cavity of the lower rack 32 and is mounted in the slotted hole of the inner cavity of the slider 31 together with the lower rack 32. The spring 35 is arranged between the spring supporting portion 52 of the clamp 33 and the bottom of the inner cavity of the lower rack 32. The clamp 33 may also be arranged in the slotted hole of the inner cavity of the slider 31.

The front foot tube 2 is provided with a locking hole for use in conjunction with the first end 51 of the clamp 33 in the inner cavity of the lower rack 32.

The unlocking pull rod 37 and the torsional spring 36 are pivotably connected to the slider 31 by a pivot shaft. Under the force of the torsional spring 36, the unlocking pull rod 37, when in a static configuration, is adjacent to the rear foot tube 4. The unlocking pull rod 37 is provided with a spiral groove on the inner side. The second end 53 of the clamp 33 passes through an elongated slotted hole on the slider 31 by means of a pin 34 and then is movably inserted into the spiral groove on the inner side of the unlocking pull rod 37.

In the deployed configuration of the frame, under the thrusting force of the spring 35, the clamp 33, in conjunction with the locking hole of the front foot tube 2, restricts the front foot tube 2 and the slider 31 from sliding relative to each other. When the frame needs to be folded, the unlocking pull rod 37 is rotated around the pivot point with the slider 31, so that the second end of the clamp 33 rotates at the distal end of the spiral groove of the unlocking pull rod 37 through the pin 34 and is oriented closer to the proximal end of the spiral groove of the unlocking pull rod 37. This causes the first end 51 of the clamp 33 to be separated from the locking hole, so that the front foot tube 2 and the slider 31 can slide relative to each other to fold the frame.

According to one embodiment of the present disclosure, a pull rope may also be connected at the second end of the clamp 33, and unlocking is therefore implemented by pulling the pull rope. Other mechanisms known in the art may be used.

According to one embodiment of the present disclosure, an unlocking cross bar 38 may be connected between the left and right symmetrical unlocking pull rods 37. The unlocking cross bar 38 can be lifted by hand, causing the unlocking pull rods 37 to rotate such that the frame can be released from the locked configuration. Meanwhile, the torsional spring 36 additionally provided between the unlocking pull rod 37 and the slider 31 ensures that the unlocking pull rod 37 and the unlocking cross bar 38, when in a static configuration, always lean against the outer side of the rear foot tube 4 and are adjacent to the seat tube 5.

According to one embodiment of the present disclosure, to prevent the risk of the unlocking pull rod 37 folding the frame unintentionally, a safety locking device is arranged between the unlocking cross bar 38 and the seat tube 5. The safety locking device comprises a hooked plastic piece 39, an unlocking cross bar 38 and a spring 40. The hooked plastic piece 39 and the spring 40 together are pivotably connected to the seat tube 5 by a pivot shaft. The spring 40 drives the hooked plastic piece 39 to approach the unlocking cross bar 38 and hook the unlocking cross bar 38. When the frame is in a fully deployed configuration the hooked plastic piece 39 is kept close to the unlocking cross bar 38 the force of the spring 40. The hooked piece 39 hooks the unlocking cross bar 38. In order for the unlocking cross bar 38 to be lifted, the hooked plastic piece 39 must first be released from the unlocking cross bar 38.

According to one embodiment of the present disclosure, after the unlocking cross bar 38 is lifted, the unlocking pull rod 37 is caused to rotate. As a result, the clamp 33 is pulled and is separated from the locking hole of the front foot tube 2. Also, the unlocking cross bar 38 is further pulled to cause the slider 31 to slide on the front foot tube 2 and causes the rear end of the seat tube 5 to turn upwards. Consequently, the hooked plastic piece 39 turns upwards simultaneously. After the frame is folded, the unlocking cross bar 38 is released, and due to the force of the torsional spring 36, the unlocking cross bar 38 automatically approaches the rear foot tube 4. When the frame is deployed, the handle tube 1 is lifted, and gravity causes the slider 31 to slide downwards along the front foot tube 2. The seat tube 5 drives the rear tube 4 into its deployed position. As part of the deployment of the frame, the first end 51 of the clamp 33 drops into the locking hole on the front foot tube 2, and the seat tube 5 returns so that the hooked plastic piece 39 is simultaneously pressed towards the unlocking cross bar 38 and hooks the unlocking cross bar 38.

According to one embodiment of the present disclosure, the front foot tube 2 is pivotably connected to the front wheel assembly 7. The front foot tube 2 is connected with the handle tube 1 by the transmission mechanism. The rear foot tube 4 is slidably connected with the front foot tube 2 by the slider 31. The rear foot tube 4 is moveably connected with the front wheel assembly 7 by the drive rod 6. The rear foot tube 4 is movably connected with the front foot tube 2 by the seat tube 5.

To unlock the frame, the unlocking cross bar 38 can be lifted by hand to cause the unlocking pull rod 37 to rotate. As a result, the first end 51 of the clamp 33 is separated from the locking hole on the front foot tube 2, and the unlocking cross bar 38 is further lifted to pull the slider 31 to slide on the front foot tube 2 through the unlocking pull rod 37, such that the handle tube 1 fixedly connected with the upper rack 22 is caused to retract into the front foot tube 2 through transmission of the gear 21. Meanwhile, the slider 31 causes the rear foot tube 4 to move upwards when sliding upwards along the front foot tube 2, and the rear foot tube 4 is pulled by the seat tube 5 to approach the front foot tube 2. During the process in which the rear foot tube 4 moves upwards and approaches the front foot tube 2 forwards, the front wheel assembly 7 is driven by the drive rod 6 connected with the rear foot tube 4 to rotate about the movable pivot point with the front foot tube 2, so that the included angle between the front wheel assembly 7 and the axis of the front foot tube 2 is reduced from an angle larger than 90 degrees to one less than or equal to 90 degrees. Also, the front wheel assembly 7 forms a surface on which the stroller frame can stand. In addition, overall frame length is shortened, thereby making storage easier.

According to one embodiment of the present disclosure, the front foot tube 2 can be divided into two parts, an upper part and a lower part of the front foot tube, which are pivotably connected to each other, and the lower part of the front foot tube is fixedly connected with the front wheel assembly 7.

The unlocking cross bar 38 can be lifted by hand to cause the unlocking pull rod 37 to rotate, so that the first end 51 of the clamp 33 is separated from the locking hole on the front foot tube 2. The unlocking cross bar 38 is further lifted to pull the slider 31 to slide on the front foot tube 2 through the unlocking pull rod 37. As a result, the handle tube 1 (fixedly connected with the upper rack 22) is caused to retract into the front foot tube 2 through transmission of the gear 21. Meanwhile, when the slider 31 slides upwards on the front foot tube 2, it causes the rear foot tube 4 to move upwards. The rear foot tube 4 is pulled by the seat tube 5 to approach the front foot tube 2. During the process in which the rear foot tube 4 moves upwards and approaches the front foot tube 2, the front wheel assembly 7 and the lower part of the front foot tube 2 are driven by the drive rod 6 (connected with the rear foot tube 4) to rotate around the pivot point with the upper part of the front foot tube 2. Consequently, the included angle between the front wheel assembly 7 and the axis of lower part of the front foot tube 2 and the axis of the upper part of the front foot tube 2 is reduced from an angle larger than 90 degrees. As a result, the front wheel assembly 7 and the lower part of the front foot tube 2 together form a surface on which the stroller frame can stand vertically for ease of storage.

According to another embodiment of the present disclosure, the front wheel assembly 7 is not designed in pairs, but is a single front wheel assembly. The front foot tube extends to be intersected with the front wheel assembly to divide each front foot tube into two parts, an upper part and a lower part, which are movably pivotably connected to each other by a pivot shaft. The front wheel assembly is fixedly connected to the lower end of the front foot tube, and the lower part of the front foot tube is movably connected with the rear foot tube by a drive rod. When folding of the frame, the drive rod drives the lower part of the front foot tube to rotate around the pivot point with the upper part of the front foot tube, and the lower part of the front foot tube forms a frame standing surface.

According to one embodiment of the present disclosure, both the clamp 33 and the slider 31 are made of plastic material or steel. The handle tube 1, the front foot tube 2, the rear foot tube 4, the seat tube 5 and the drive rod 6 are made of steel or aluminum alloy. The front foot tube 2, the rear foot tube 4 and the handle tube 1 are integrally formed tubes.

In embodiments of the present disclosure having a pivotable front wheel, during folding of the frame, rotation of the front wheel assembly around the movable pivot point with the front foot tube can be implemented continuously. As a result, the included angle between the front wheel assembly and the front foot tube is shortened. The front wheel assembly forms a stroller frame standing surface to enable the stroller frame to stand and reduce the length of the frame. Meanwhile, driven by the gear transmission mechanism, the handle tube retracts into the front foot tube, to further shorten the folded frame. Consequently, a user does not has to stoop down to store the stroller. Also, since the length of the folded frame is shortened, the stroller is more convenient and easier to store.

Finally it should be noted that the above embodiments are only intended for illustrative purposes and do not limit the technical solution of the present disclosure. Although the present disclosure is described in details with reference to some embodiments, a person of ordinary skilled in the art should understand that the particular embodiments of the present disclosure can be modified or some technical features can be substituted equivalently. Such modifications and substitutions should also be encompassed in the scope of the technical solution claimed by the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The present disclosure is not to be limited in scope by the specific embodiments described herein. Indeed, various other embodiments of and modifications to the present disclosure, in addition to those described herein, will be apparent to those of ordinary skill in the art from the foregoing description and accompanying drawings. These other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A stroller comprising:
a frame;
a front wheel assembly and a rear wheel assembly;
the frame comprising a front foot tube, a rear foot tube, a seat tube, a drive rod and a slider, the slider being slidably connected with the front foot tube, the lower end of the front foot tube being pivotably connected to the front wheel assembly, an upper end of the rear foot tube being pivotably connected to the slider, the lower end of the rear foot tube being fixedly connected with the rear wheel assembly, the two ends of the seat tube being pivotably connected to the front foot tube and the rear foot tube, respectively, the two ends of the drive rod being pivotably connected to the rear foot tube and the front wheel assembly, respectively, the frame having at least two configurations, a folded configuration and a deployed configuration, and the frame comprising a locking mechanism for keeping the frame in the deployed configuration, wherein in folding of the frame, the slider slides upwards relative to the front foot tube, and a lower end of the rear foot tube is driven by the seat tube and moves towards the front foot tube, and the drive rod drives the front wheel assembly to rotate around a pivot point of a lower end of the front foot tube.

2. The stroller of claim 1, wherein during folding of the frame, the included angle between the front wheel assembly and a longitudinal axis of the front foot tube becomes smaller; and when the frame is in the folded configuration, the included angle between the front wheel assembly and the longitudinal axis of the front foot tube is less than or equal to 90 degrees, and the front wheel assembly forms a frame standing surface.

3. The stroller of claim 2, wherein the frame further comprises a handle tube telescopically inserted in the upper end of the front foot tube.

4. The stroller of claim 3, wherein the frame further comprises a transmission mechanism comprising an upper rack, a lower rack and a gear, the gear being pivoted in the front foot tube, the upper rack being fixedly connected with the lower end of the handle tube, inserted in the front foot tube and being engaged with the gear, the slider being sleeved on the front foot tube, the lower rack being engaged with the gear, a through slot being formed in the front foot tube at the position where the lower rack and the gear are engaged, the upper part of the lower rack passing through the through slot, and being located outside the front foot tube and fixedly connected with the slider, wherein during rotation of the gear, the upper rack and the lower rack move in opposite directions.

5. The stroller of claim 1, wherein the locking mechanism comprises a clamp, an elastic element, a pin and an unlocking pull rod, the clamp being an integrally formed piece with two ends and being arranged in a slotted hole formed in an inner cavity of the slider, a locking hole being formed in the front foot tube on a contact surface where the front foot tube and the slider slide relative to each other and engaged with the first end of the clamp, the elastic element being arranged in the slotted hole, the unlocking pull rod being pivotably connected to the slider and provided with a spiral groove on an inner side, an elongated slotted hole being formed at the lower part of the slider, one end of the pin being pivotably connected to the second end of the clamp and the other end of the pin passing through the elongated slotted hole and being inserted into the spiral groove on the inner side of the unlocking pull rod, wherein when the frame is deployed in a locked configuration, the first end of the clamp is pushed by the elastic element and engages with the locking hole to restrict the front foot tube and the slider from sliding relative to each other, and when the frame is folded, the unlocking pull rod is rotated so that the radius of the curved surface of the spiral groove cooperating with the other end of the pin is reduced to cause the other end of the pin to move downwards and compress the elastic element and cause the first end of the clamp to be separated from the locking hole, and the front foot tube and the slider are capable of sliding relative to each other.

6. The stroller of claim 5, wherein the frame further comprises a safety locking device, which comprises an unlocking cross bar, a hooked plastic piece and an elastic element, the two ends of the unlocking cross bar being pivotably connected to the unlocking pull rod, respectively, the elastic element being pivotably connected to the seat tube by a pivot shaft, the hooked plastic piece being fixedly connected with the elastic element, wherein when the frame is in a fully deployed configuration, the hooked plastic piece approaches the unlocking cross bar under the force of the elastic element and hooks the unlocking cross bar, and before the unlocking cross bar is lifted, the hooked plastic piece is released from the unlocking cross bar.

7. The stroller of claim 5, wherein both the clamp and the slider are made of a material selected from a group consisting of plastic, steel, and aluminum alloy.

8. The stroller of claim 1, wherein the handle tube, the front foot tube, the rear foot tube, the seat tube and the drive rod are made of a material selected from a group consisting of plastic, steel, and aluminum alloy.

9. A stroller having a frame, the frame having at least a deployed configuration and a folded configuration, the frame comprising:
a front foot tube; and
a front wheel assembly pivotably connected to the front foot tube;
a rear foot tube connected to the front foot tube via a slider; and
a driver pivotably connected to the rear foot tube and pivotably connected to the front foot tube;

wherein the front wheel assembly in the folded configuration comprises a substantially flat portion, the substantially flat portion being substantially perpendicular to the front foot tube;

wherein, when the frame transitions from the deployed configuration into the folded configuration, the driver drives the front wheel assembly to rotate with respect to the front foot tube; and wherein, when the frame transitions from the deployed configuration to the folded configuration, the slider moves away from the front wheel assembly.

10. The stroller of claim 9 wherein, in the folded configuration, an angle between the front wheel assembly and a longitudinal axis of the front foot tube is less than or equal to 90 degrees.

11. The stroller of claim 9 wherein the rear tube is connected to a rear wheel assembly.

12. The stroller of claim 11 wherein the rear wheel assembly and the front wheel assembly each comprises a pair of wheels.

13. The stroller of claim 9 further comprising a handle tube that telescopically engages the front foot tube.

14. The stroller of claim 13 wherein the slider comprises:
a gear connected to the front foot tube;
a first rack engaged with the gear, the first rack fixedly connected with the handle tube; and
a second rack engaged with the gear, the second rack arranged in an inner cavity of the slider;
wherein the first rack and the second rack move in opposite directions during rotation of the gear.

15. The stroller of claim 14 further comprising a locking mechanism engaged with the slider, the locking mechanism configured to keep the frame in the deployed configuration while the locking mechanism is engaged.

16. The stroller of claim 15, wherein the locking mechanism comprises a clamp arranged in an inner cavity of the second rack, the clamp engaging with a locking hole of the front foot tube.

17. The stroller of claim 16 wherein the clamp further comprises a support portion, and an elastic element is disposed between the support portion and the inner cavity, the elastic element applying a thrusting force, the thrusting force keeping the clamp engaged with the locking hole.

18. The stroller of claim 17 further comprising an unlocking pull rod operatively connected to the slider, the unlocking pull rod having a spiral groove engaging with the clamp, wherein movement of the unlocking pull rod causes the clamp to rotate and disengage from the locking hole.

* * * * *